(12) United States Patent
Berg

(10) Patent No.: US 7,754,090 B1
(45) Date of Patent: Jul. 13, 2010

(54) PORTABLE ULTRAVIOLET WATER TREATMENT APPARATUS

(75) Inventor: Paul A. Berg, Corvallis, OR (US)

(73) Assignee: CH2M HILL, Inc., Englewood, CO (US)

( * ) Notice: Subject to any disclaimer, the term of this patent is extended or adjusted under 35 U.S.C. 154(b) by 0 days.

(21) Appl. No.: 12/126,620

(22) Filed: May 23, 2008

Related U.S. Application Data

(60) Provisional application No. 60/939,805, filed on May 23, 2007, provisional application No. 60/957,850, filed on Aug. 24, 2007.

(51) Int. Cl.
    *C02F 1/48* (2006.01)
    *B01J 19/12* (2006.01)
(52) U.S. Cl. .................................. 210/748.01
(58) Field of Classification Search ................. 210/192, 210/198.1, 748, 748.01
    See application file for complete search history.

(56) References Cited

U.S. PATENT DOCUMENTS

| | | | |
|---|---|---|---|
| 6,180,003 B1 * | 1/2001 | Reber et al. | 210/198.1 |
| 6,583,422 B2 | 6/2003 | Boehme | |
| 6,752,971 B2 | 6/2004 | Boehme | |
| 6,956,220 B2 * | 10/2005 | Traubenberg et al. | 250/432 R |
| 2004/0074252 A1 * | 4/2004 | Shelton | 62/318 |
| 2005/0016907 A1 | 1/2005 | Yuen | |
| 2005/0109690 A1 * | 5/2005 | Bechtold | 210/239 |
| 2007/0125713 A1 | 6/2007 | Harris | |

FOREIGN PATENT DOCUMENTS

JP     09225012 A   *  9/1997

OTHER PUBLICATIONS

Machine translation of JP 09225012 A (Sep. 1997).*

* cited by examiner

*Primary Examiner*—Walter D Griffin
*Assistant Examiner*—Cameron J Allen
(74) *Attorney, Agent, or Firm*—Dorsey & Whitney LLP

(57) ABSTRACT

A portable water treatment apparatus may include a container, a UV light source, and a user-powered generator. The container may include first and second portions removably joined or factory sealed together and defining a chamber to receive water. The UV light source, such as a UV light bulb, may be contained within the chamber. A user-powered generator, such as a hand or pedal crank generator, may be operatively associated with the UV light. Operation of the user-powered generator may provide electrical power to the UV light source for disinfecting water received within the chamber. The UV light source may also be powered using an electrical outlet, a battery, or solar power. The portable water treatment apparatus may further include a mixing device for moving water within the container, and an electrical disconnect for selectively connecting and disconnecting the electrical power connection between the user-powered generator and the UV light source.

11 Claims, 12 Drawing Sheets

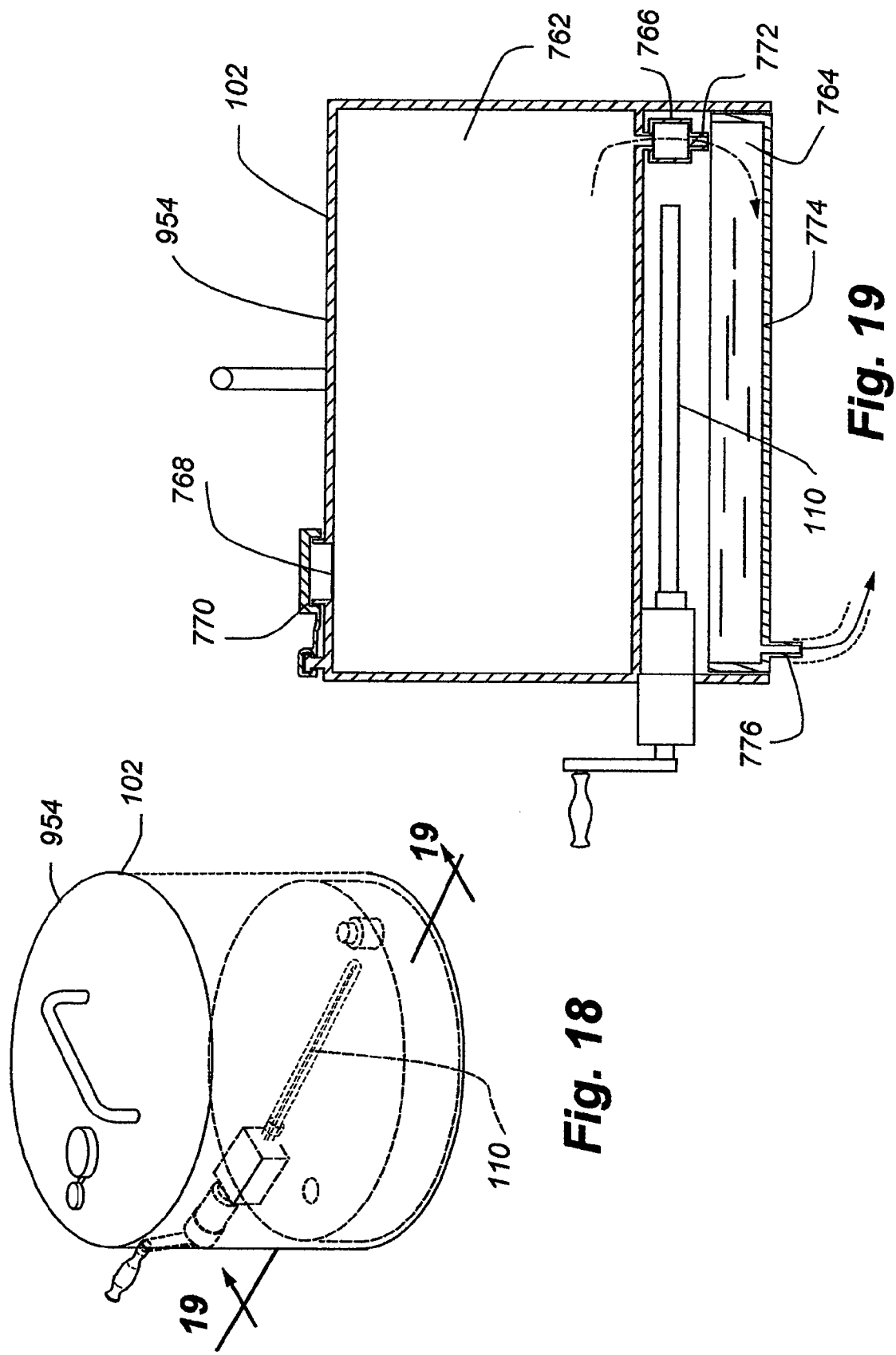

PORTABLE ULTRAVIOLET WATER TREATMENT APPARATUS

CROSS-REFERENCE TO RELATED APPLICATIONS

This application claims under 35 U.S.C. §119(e) the benefit of U.S. Provisional Application No. 60/939,805, entitled "Portable Ultraviolet Water Treatment Apparatus and filed on May 23, 2007, and U.S. Provisional Application No. 60/957, 850, entitled "Portable Ultraviolet Water Treatment Apparatus and filed on Aug. 24, 2007; the disclosures of which are hereby incorporated by reference herein in their entireties.

FIELD OF INVENTION

The present invention generally relates to drinking water treatment, and more specifically to disinfecting drinking water using ultraviolet (UV) light.

BACKGROUND

Many people do not have sustainable access to safe drinking water. An estimated 1.1 billion people do not have access to an improved source of drinking water with an estimated 84 percent of them living in rural areas. Further, an estimated 70 percent of rural dwellers do not have access to piped water in the home. These rural dwellers often hand-carry water to their homes in various containers. In such cases, the source of the water may be from a river, lake, or shallow (hand-dug) well. It is common for these water sources to yield unsafe drinking water. Meanwhile, urban dwellers without access to piped water may obtain water from delivery trucks and haul it to their homes in various containers. It is not uncommon for water delivered by truck in developing countries to be of unsafe quality. Yet further, the piped water received by many rural or urban dwellers in developing countries is often of questionable quality.

Various approaches and devices have been developed to address the issue of providing safe drinking water to those people without access to an improved source of drinking water. One approach involves adding chlorine to disinfect water. Although chlorine chemical treatment is relatively inexpensive and effective, it imparts an off-taste to water and requires continual replenishment of the chlorine chemical supply. Another approach uses 2-liter plastic bottles to provide disinfection through use of sunshine and raised water temperature. Bottles are filled with water and left in the sunshine for at least six hours to accomplish disinfection. Because 2-liter bottles are nearly ubiquitous throughout the world and there are no chemicals or energy costs, this approach is relatively affordable. However, an impediment to its use relates to the time delay for disinfection to occur since people must plan ahead and recycle bottles daily to maintain a safe water supply. This requires recognizing the importance of safe water and investing the time and effort to achieve it, which makes this a less than ideal approach. Another approach uses biosand filters. These also require significant time, effort and commitment on the part of the user. Still yet another device is an inexpensive ceramic water filter that uses a colloidal silver lining to accomplish disinfection. The design uses a plastic bucket with a clay filter that removes larger particles, but the colloidal silver lining is necessary to achieve successful treatment.

Accordingly, improved approaches and systems are needed in the art for reliably producing water safe for consumption and use by people.

BRIEF SUMMARY

One aspect of the present invention may take the form of a water treatment apparatus. The water treatment apparatus may include a container, a UV light source, and a user-powered generator. The container may include a chamber to receive water. The UV light source may be contained within the chamber. The user-powered generator may be operatively associated with the UV light. Operation of the user-powered generator may provide electrical power to the UV light source for treating water received within the chamber using the UV light source.

Another aspect may take the form of a water treatment apparatus. The water treatment apparatus may include a container, a UV light source, and an electrical supply. The container may include a chamber to receive a batch of water. The UV light source may be contained within the chamber. The electrical supply may be operatively associated with the UV light source. The electrical supply may provide electrical power to the UV light source for treating the batch of water received within the chamber using the UV light source.

BRIEF DESCRIPTION OF THE DRAWINGS

FIG. 18 is a perspective view of a second example of an upper portion of a container for use with a water treatment apparatus.

FIG. 19 is a cross-section view of the upper portion shown in FIG. 18, viewed along line 19-19 in FIG. 18.

DETAILED DESCRIPTION

Described herein are various examples of portable water treatment devices. The portable water treatment devices may take the form of a container with a UV light source for treating water placed within the container. The UV light source may provide a sufficient UV dose to disinfect water placed within the container within a relatively short period of time. The UV light source may be powered by a generator. The generator may be a user-powered generator, such as a hand-cranked or pedal powered generator. In some embodiments, the water treatment devices may include an energy storage device, such as a battery, for storing power and/or a plug for providing electricity to power the UV light from an electrical outlet. In some embodiments, the portable water treatment devices may further include an inlet and an outlet for supplying and removing water, respectively, to and from the container.

Figure 1:
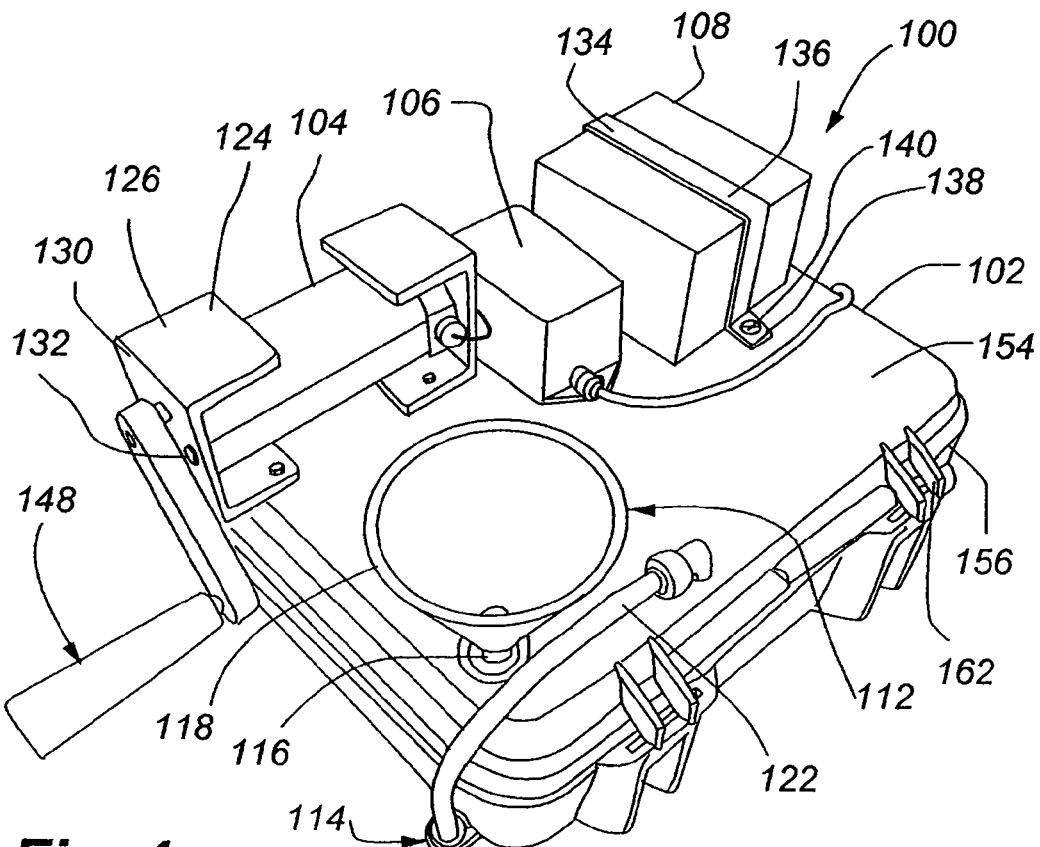
FIG. 1 is a perspective view of a first example of a water treatment apparatus.
Figure 2:
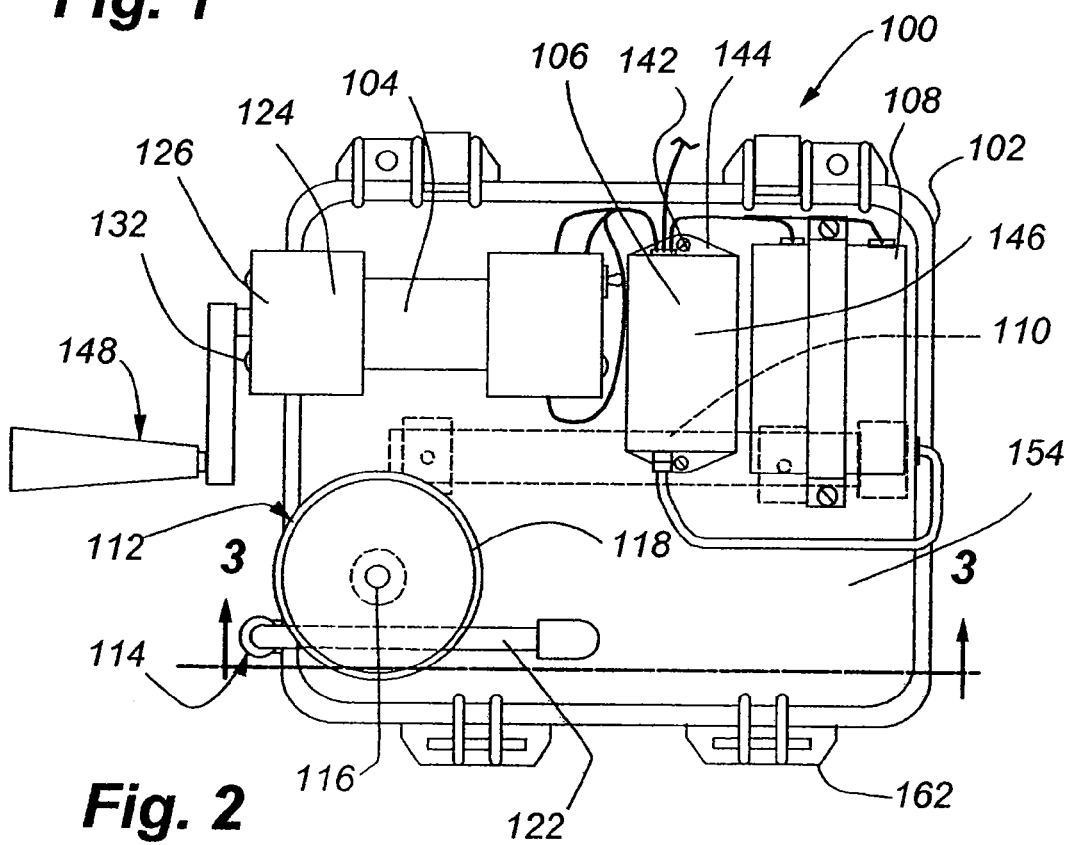
FIG. 2 is a top plan view of the water treatment apparatus shown in FIG. 1 with a UV light source contained with a contained of the water treatment apparatus and shown in broken line.

FIGS. 1-4 depict a first example of a portable water treatment apparatus 100. With reference to FIGS. 1 and 2, the portable water treatment apparatus 100 may include a container 102, a user-powered generator 104, a ballast 106, an energy storage device 108, a UV light source 110, a fluid input assembly 112, and a fluid delivery assembly 114. The fluid input assembly 112 may include a fluid inlet or port 116 defined in the container 102. In some versions of the portable water treatment apparatus 100, the fluid input assembly 112 may include a cap to selectively close the fluid inlet or port 116. The fluid input assembly 112 may further include a funnel 118 or other water collection device that may be selectively placed in fluid communication with the fluid inlet 116. The fluid delivery assembly 114 may include a fluid outlet or port 120 (see FIG. 3 for the fluid port 120) defined in the container 102. The fluid delivery assembly 114 may further include a tube 122, spigot, or other fluid supply device in fluid communication with the fluid outlet 120.

Figure 4:
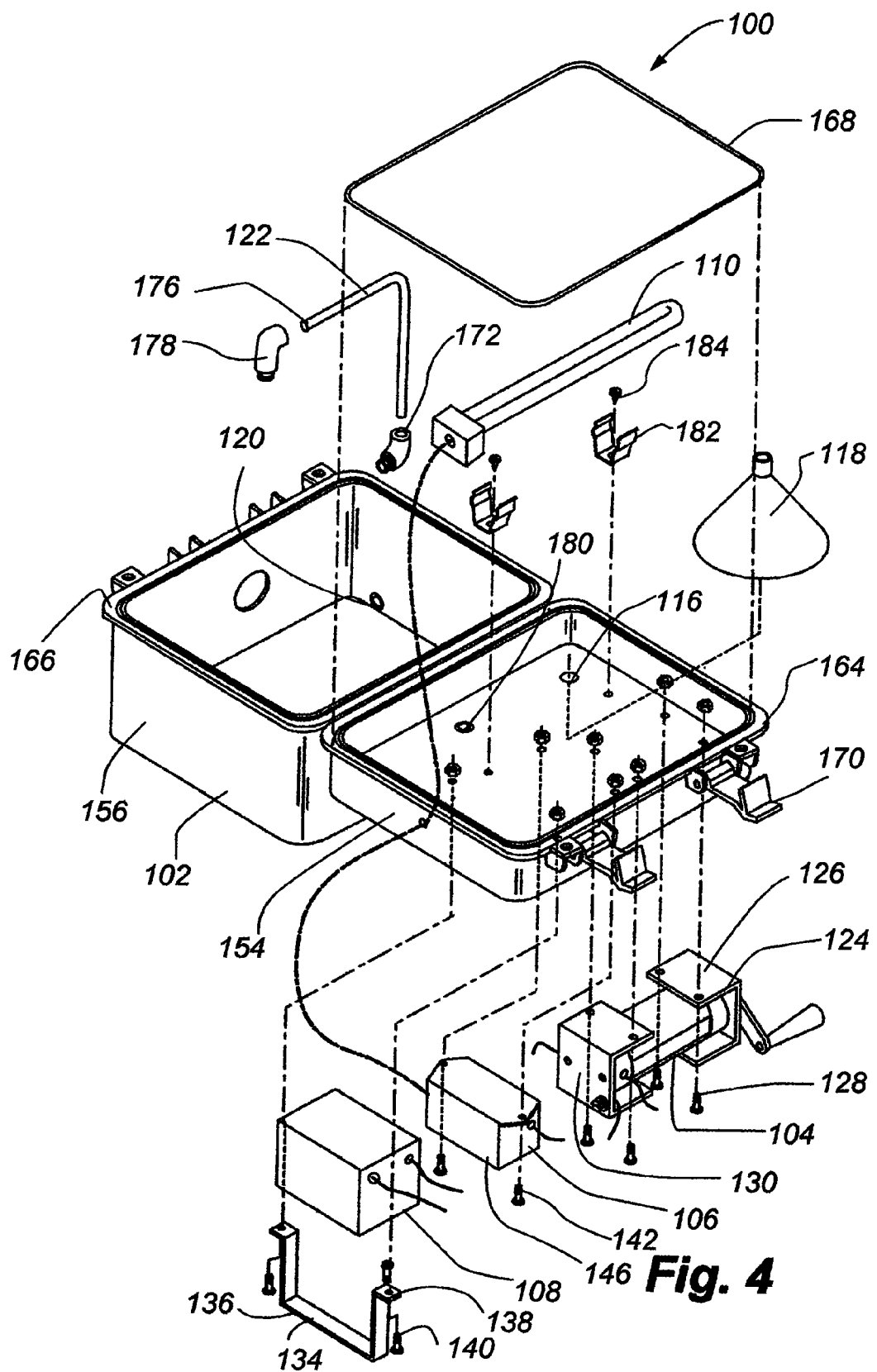
FIG. 4 is an exploded perspective view of the water treatment apparatus shown in FIG. 1.
Figure 5:
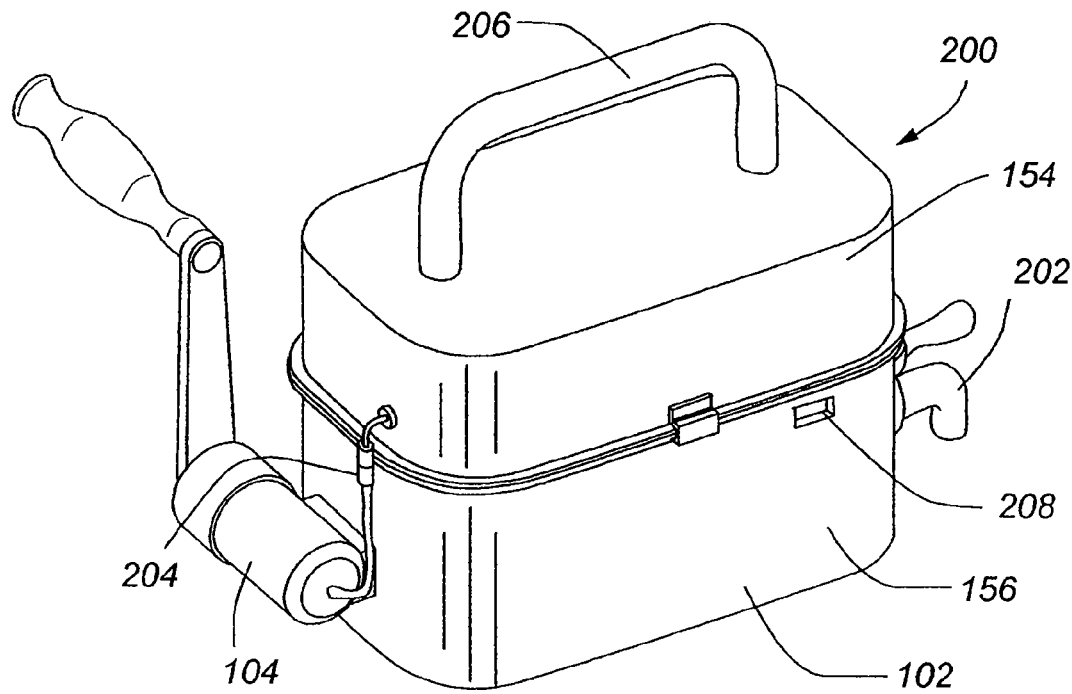
FIG. 5 is a perspective view of a second example of a water treatment apparatus.
Figure 6:
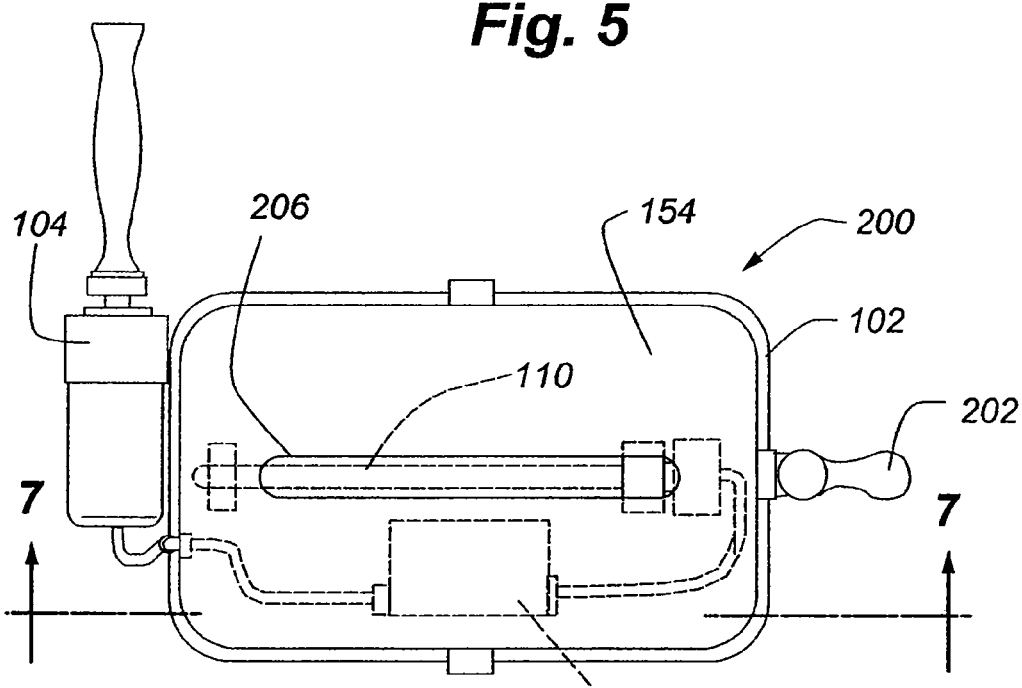
FIG. 6 is a top plan view of the water treatment apparatus depicted in FIG. 5 with a ballast and a UV light source contained within a container of the water treatment apparatus and shown in broken line.
Figure 7:
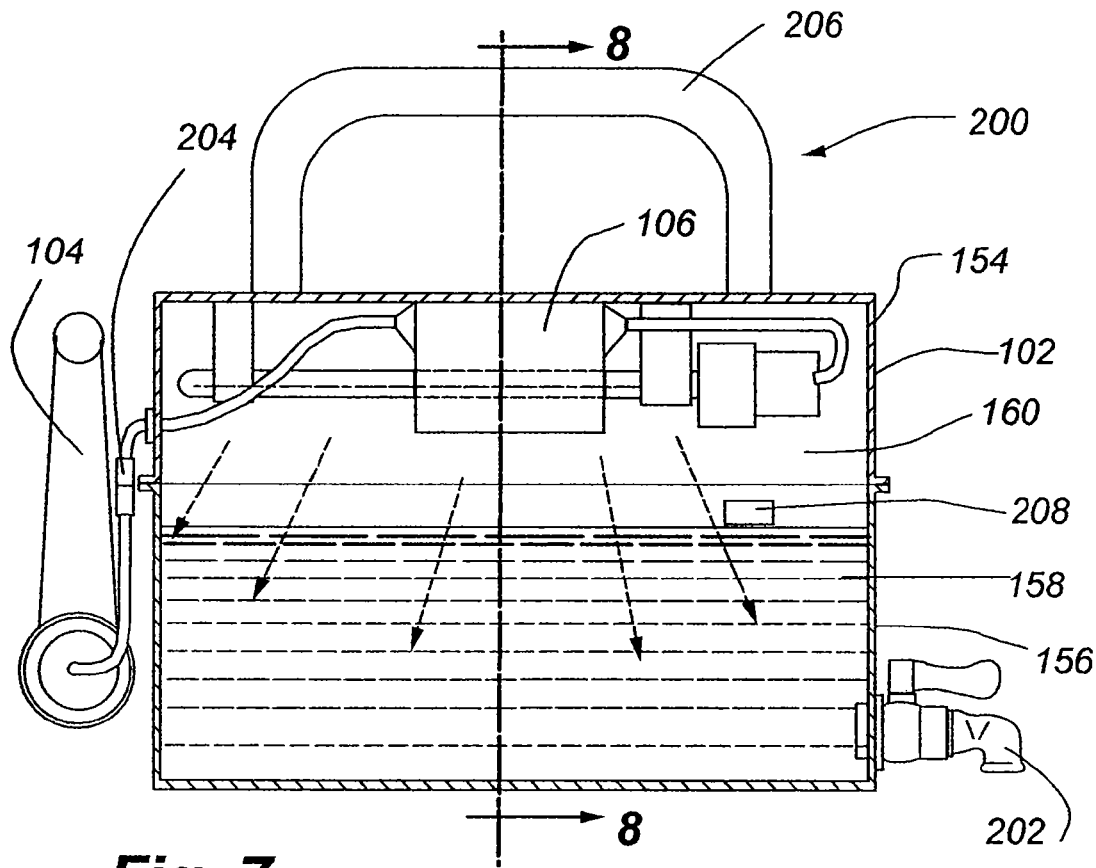
FIG. 7 is a cross-section view of the water treatment apparatus shown in FIG. 5, viewed along line 7-7 in FIG. 6.
Figure 8:
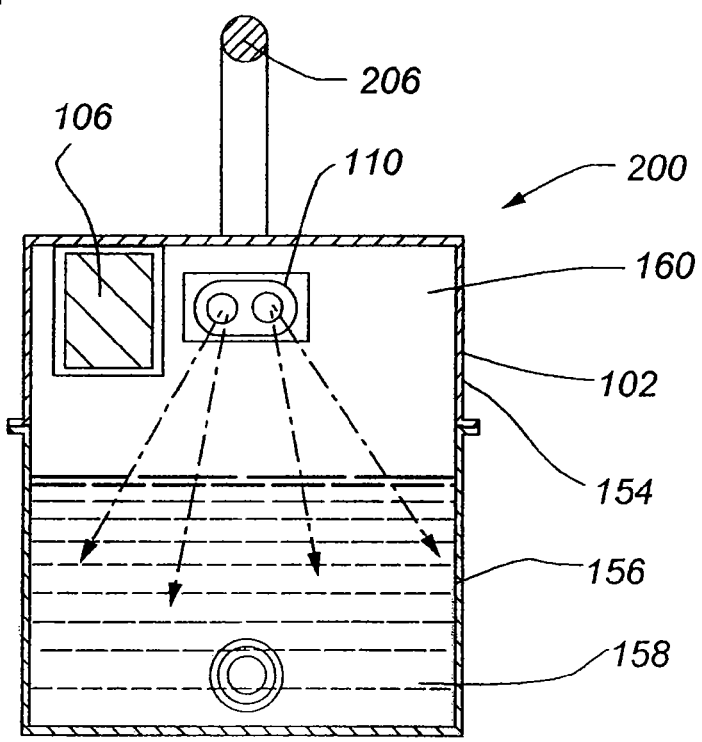
FIG. 8 is another cross-section view of the water treatment apparatus shown in FIG. 5, viewed along line 8-8 in FIG. 7.

With reference to FIGS. 1, 2 and 4, the user-powered generator 104, the ballast 106, and the energy storage device 108 may be mounted or otherwise joined to the container 102, fixedly or removably, by any suitable connection system or method. For example, the user-powered generator 104 may be removably mounted to the container 102 with two generally C-shaped generator brackets 124. Flanges 126 for each generator bracket 124 may be joined to the container 102 using one or more first generator bracket fasteners 128, such as screws, bolts or the like, to connect each generator bracket 124 to the container 102. Webs 130 for each generator bracket 124 may be joined to the user-powered generator 104 using one or more second generator bracket fasteners 132, such as screws, bolts or the like, to connect the user-powered generator 104 to the user-powered generator bracket 124, and thus join the user-powered generator 104 to the container 102.

As another example, the energy storage device 108 may be removably mounted to the container 102 using an energy storage bracket 134. The energy storage bracket 134 may include a generally C- or U-shaped energy storage bracket main body 136 with energy storage bracket flanges 138 that extend from the free ends of the energy storage bracket main body 136. Each energy storage bracket flange 138 may be joined to the container 102 using one or more energy storage bracket fasteners 140, such as screws, bolts or the like, to connect the energy storage bracket 134 to the container 102. The energy storage device 108 may be positioned between the energy storage bracket 134 and the container 102 to join the energy storage device 108 to the container 102.

As still yet another example, the ballast 106 may be removably joined to the container 102 using one or more ballast fasteners 142, such as screws, bolts, or the like. More specifically, the ballast 106 may include ballast flanges 144 that extend from a main ballast body 146. Each ballast flange 144 may be joined to the container 102 using one or more ballast fasteners 142, such as screws, bolts or the like, to connect the ballast 106 to the container 102.

The foregoing examples of connection systems for joining the user-powered generator 104, the ballast 106, and the energy storage device 108 to the container 102 are merely illustrative and are not intended to require use of any specific connection system, or require that these components of portable water treatment apparatuses be removably joined to the container 102.

The user-powered generator 104 may be a hand crank generator, such as the EM-8090 hand crank generator sold by Pasco of Roseville, Calif. or a commercially available small DC motor, or any other generator receiving input energy from a user. A user may rotate a crank 148 of the user-powered generator 104 to generate electricity. The generated electricity may power the UV light source 110 (see FIGS. 2 and 3 for the UV light source 110). The UV light source 110 may at least partially disinfect any fluid or water contained within the container 102 through UV radiation. The user-powered generator 104 may be electrically joined to the UV light source 110 via the ballast 106 using electrical wires or other suitable electricity conveyance devices. The user-powered generator 104 may also be electrically joined to the energy storage device 108 via an electrical wire or other suitable electricity conveyance device to provide electrical energy to the energy storage device 108.

The energy storage device 108 may be a rechargeable battery, such as a 12 Volt, 4.5 Amp-hour rechargeable battery sold by Atlas Battery. The energy storage device 108 may be electrically joined to the user-powered generator 104 and the UV light source 110. The energy storage device 108 may be used to store energy for powering the UV light source 110 in order to operate the UV light source 110 at desired times.

Figure 2A:
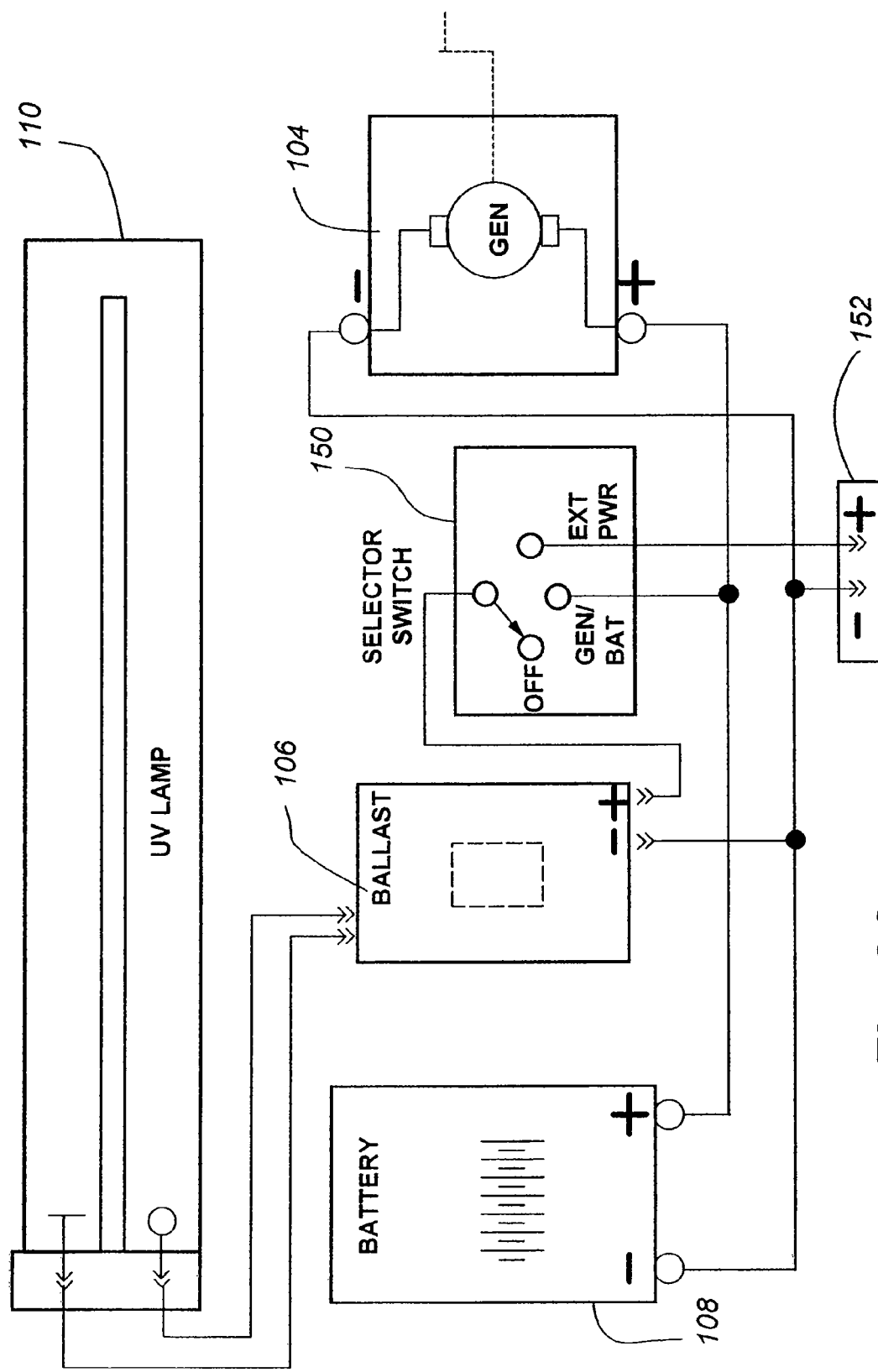
FIG. 2A is a schematic view of a possible electrical arrangement for the portable water treatment apparatus shown in FIG. 1.

With reference to FIG. 2A, a switch 150, such as an on/off switch, a three-way switch or any other suitable switch, may be used to selectively electrically connect and disconnect the power supplied by the energy storage device 108 and/or the user-powered generator 104 to the UV light source 110. For example, an electrical circuit that includes the switch 150, the user-powered generator 104, the ballast 106, the energy storage device 108, the UV light source 110, and an external power source may be formed by electrically joining the switch 150 to the user-powered generator 104, the ballast 106, the energy storage device 108, and the external power source using electrical wires, and by electrically joining the ballast 106 to the UV light source 110 using an electrical wire. The switch 150 may include an "Off" position, a "Gen/Bat" position, and an "Ext Pwr" position.

The switch 150 may be positioned within the electrical circuit, as shown, for example, in FIG. 2A, such that when placed in the "Gen/Bat" position, power is supplied to the ballast 106 from the user-powered generator 104 and/or the energy storage device 108, thus supplying power from the user-powered generator 104 and/or the energy storage device 108 to the UV light source 110 via the electrical connection between the ballast 106 and the UV light source 110. The switch 150 may also be positioned within the electrical circuit such that when placed in the "Ext Pwr" position, power is supplied to the UV light source 110 via the ballast 106 from an external power source, such as electrical outlet using for example, an electrical plug 152 joined to the switch 150 by an electrical wire.

The switch 150 may further be positioned within the electrical circuit such that when placed in the "Off" position, the electrical connection between the user-powered generator 104 and the ballast 106 is terminated, thus terminating transfer of power from the user-powered generator 104 to the UV light source 110 via the ballast 106. Additionally, the switch 150 may be positioned within the electrical circuit such that when in the "Off" position, the electrical connection between the energy storage device 108 and the ballast 106 is also terminated, thus terminating transfer of power from the energy storage device 108 to the UV light source 110 via the ballast 106. Yet further, the switch may be positioned within the electrical circuit such that when in the "Off" position, the electrical connection between the external power source and the ballast 106 is terminated, thus terminating transfer of power from the external power source to the UV light source 110 via the ballast 106.

Although the electrical connections between the user-powered generator 104, the energy storage device 108, the ballast 106, the external power source, and the UV light source 110 are shown and described with a certain particularity, any other electrical connection configuration may be utilized for the portable water treatment apparatus 100.

The energy storage device 108 may also even out the power that is supplied from the user-powered generator 104, or other power source, to the ballast 106 and/or the UV light source 110. In place of or in combination with the energy storage device 108, the portable water treatment apparatus 100 may include a capacitor electrically connected to the user-powered generator 104, the UV light source 110, and/or the ballast 106 to even out the power that is supplied from the user-powered generator 104 to the ballast 106 and/or the UV light source 110. Some versions of the portable water treatment apparatus 100 may have neither an energy storage device 108 nor a capacitor.

Figure 3:
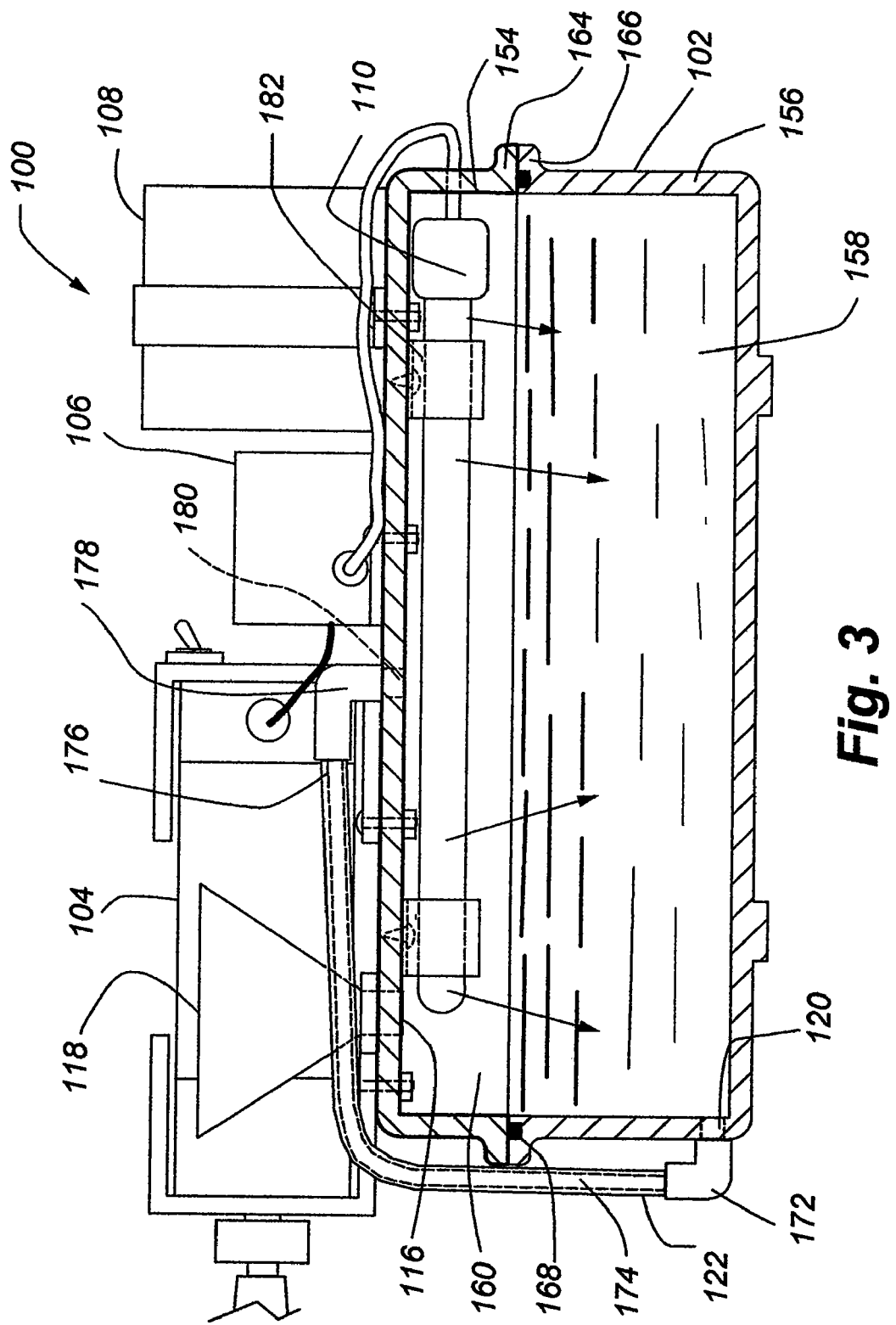
FIG. 3 is a cross-section view of the water treatment apparatus shown in FIG. 1, viewed along line 3-3 in FIG. 2.

Turning to FIG. 3 among other figures, the container 102 may include upper and lower portions 154, 156 selectively joined together. The lower portion 156 may define a reservoir 158 for holding water. If desired, at least a portion of the upper portion 154, up to the entire upper portion 154, may also define a portion of the reservoir 158. The upper portion 154 may take the form of a lid. The UV light source 110 may be mounted to the upper portion 154. The upper portion 154 may protect the UV light source 110 from impact damage. The upper portion 154 may also shield the eyes of those near the container 102 from exposure to UV light emitted by the UV light source 110.

When the upper and lower portions 154, 156 are joined, the upper and lower portions 154, 156 may define a chamber 160. Further, at least a portion of the chamber 160 may be considered as the reservoir 158 for containing water. The reservoir 158 may hold any desired quantity of water. For example, in some versions of the portable water treatment apparatus 100, the reservoir 158 may hold approximately 1 to 5 liters of water. As another example, in other versions of the portable water treatment apparatus 100, the reservoir 158 may hold approximately 2 to 20 liters of water. The foregoing examples are merely illustrative and are not intended to limit the reservoir capacity for this or any other example of the portable water treatment apparatus to a particular amount.

With reference to FIGS. 1 and 2, the upper and lower portions 154, 156 may be joined at one side of the container 102 by one or more container hinges 162. The container hinges 162 maintain the connection between the upper and lower portions 154, 156 while allowing the upper portion 154 to be selectively pivoted or otherwise moved relative to the lower portion 156 to provide access to the chamber 160. In some versions of the portable water treatment apparatus 100, the hinges 162 may be omitted so that the upper and lower portions 154, 156 may be disconnected from each other.

The container 102, and any container or other water storage device for any other example or version of a portable water treatment apparatus, may be cuboid, cylindrical, or any other desired shape. The container 102, and any container or other water storage device for any other example or version of a portable water treatment apparatus, may be formed of plastic, metal, ceramic, or any other suitable material or combination of materials.

Turning to FIGS. 3 and 4, the upper and lower portions 154, 156 may include upper and lower portion flanges 164, 166 respectively that extend outward from their respective portions and are positioned proximate the interface between the upper and lower portions 154, 156. A gasket, O-ring or other suitable fluid sealing member 168 may be positioned between the flanges 164, 166 to prevent liquid from flowing through the joint formed at the interface of the upper portion 154 to the lower portion 156. In some versions of the portable water treatment apparatus, the upper and lower portions 154, 156 may be permanently, or relatively permanently, joined after manufacture and prior to delivery to the user so that the user cannot separate the two portions 154, 156.

One or more securing devices 170, such as latches, may be positioned proximate the flanges 164, 166. The securing devices 170 may be snapped onto, or otherwise joined, to the flanges 164, 166 to secure the upper portion 154 of the container 102 to the lower portion 156 of the container 102, thus preventing separation of the upper and lower portions 154, 156. The securing devices 170 may be selectively disconnected from the flanges 164, 166 to permit the upper portion 154 to be separated from the lower portion 156. Such separation may be desired to fill the lower portion 156 with fluid or to access the various internal components of the portable water treatment apparatus 100.

The upper or lower portion 154, 156 may include the fluid inlet 116, which may be selectively opened or closed with a cap or other closure device, to fill the chamber 160 with fluid. The funnel 118 may be selectively joined to the fluid inlet 116 to facilitate filling the fluid reservoir 158 via the fluid inlet 116. In some versions of the portable water treatment apparatus 100, the funnel 118 may be fixedly joined to the container 102. In some versions of the portable water treatment apparatus, the fluid inlet 116 may be omitted and access to the reservoir 158 may be permitted via separating the upper portion 154 of the container 102 from the lower portion 156 of the container 102.

The lower portion 156 may include the fluid outlet 120 in fluid communication with the fluid conduit 122. A lower elbow 172 or other piping connection structure may join the fluid conduit 122 to the container 102. The lower elbow 172 may be joined to the container 102 by any suitable connection system or method, including, but not limited to, by mechanical fastening (e.g., joining the lower elbow 172 to the container 102 by engagement of threads), welding, or adhering the lower elbow 172 to the container 102. An O-ring or other suitable seal element may be positioned between the lower elbow 172 and the fluid outlet 120 to limit flow through the connection joint formed between the lower elbow 172 and the container 102.

The fluid conduit 122 may be press fit or otherwise suitably joined to the lower elbow 172. Fluid communication between the fluid outlet 120 and a fluid conduit passage 174 defined by the fluid conduit 122 may be enabled via an elbow fluid passage defined in the lower elbow 172. In some versions of the portable water treatment apparatus 100, the fluid conduit 122 and lower elbow 172 may be replaced with a commercially available spigot. The spigot may be selectively opened to deliver fluid from the fluid reservoir 158. The spigot may be removably (e.g., threaded) or fixedly (e.g., heat welded) joined to the container 102 by any suitable connection method.

An upper or distal end portion 176 of the fluid conduit 122 may be selectively joined to an upper elbow 178 or other piping connection structure by press fit or other suitable connection system or method. Like the lower elbow 172, the upper elbow 178 may be joined to container 102 by any suitable connection system or method. Also like the lower elbow 172, an O-ring or other suitable seal element may be positioned between the upper elbow 178 and the container 102 to limit fluid flow through the connection joint formed between the upper elbow 178 and the container 102. The upper elbow 178 may be positioned proximate an air opening or hole 180. The air opening 180 may allow air to exit the chamber 160 when it is filled with fluid. More particularly, the upper elbow 178 may define a fluid or air passage in fluid communication with the air opening 180. Upon selective removal of the fluid conduit 122 from the upper elbow 178, fluid or air communication between the atmosphere and the chamber 160 is provided via the air opening 180 and the fluid passage in the upper elbow 178. Thus, air may flow between the atmosphere and the chamber 160 through the air opening 180 and the fluid passage in the upper elbow 178 when the fluid conduit 122 is disconnected from the upper elbow 178. Such air flow may allow air to exit the reservoir 158 when filling the reservoir 158 via the fluid inlet 116 with water or other fluid.

The UV light source 110 may be configured to provide a UV dose of at least approximately 20 mJ/cm$^2$, with some UV light sources providing UV doses of approximately 40 mJ/cm$^2$. However, any UV dose sufficient for disinfecting the water may be used, including UV doses more or less than 40 mJ/cm$^2$. The UV dose delivered to the water may depend upon the irradiance of the UV light source at 254 nm, the distance from the UV light source to the water surface (when the UV light source is positioned above the water or other fluid), the depth of the water, the UV absorbance of the water at 254 nm, and the exposure time. The UV absorbance for the water may vary depending upon the quality of the water. A color wheel may be used with the portable water treatment apparatus 100 to approximate the absorbance of the water and to correlate this absorbance to the minimum required exposure for treating the water to a desired level of disinfection. The color wheel may or may not be attached to the container 102. If attached, the color wheel may be removably or fixedly joined to the container 102 by any suitable connection method, including, but not limited to, by mechanical fasteners or adhesives. Fixedly attaching the color wheel to the container 102 may keep the color wheel from being misplaced or lost.

The UV light source 110 may take the form of one or more UV lamps or light bulbs. One possible UV lamp is a Biox™ Germicidal UV lamp sold by General Electric of Fairfield, Conn. The UV lamp selected for a particular portable water treatment apparatus 100 may be based upon the upper limit of the power available from the user-powered generator 104. For example, a hand crank generator may have an upper limit of approximately 50 Watts. As another example, a generator powered by electricity from a power outlet or a bicycle may have an upper limit of at least 125 Watts. Accordingly, the UV lamp selected may require approximately 50 Watts or less of power for an hand power generator and approximately 125 Watts or less for a bike powered generator. Table 1 provides the required power input and irradiance for various types of Biox™ Germicidal UV lamps.

TABLE 1

Example of Properties for Various Types of Biox ™ Germicidal UV lamps

| Product Code | Description | Required Power Input (Watts) | Irradiance (uW/cm$^2$) |
|---|---|---|---|
| 40695 | GBX5/UVC G23 | 5 | 9.0 |
| 40696 | GBX9/UVC G23 | 9 | 22.0 |
| 40700 | GBX11/UVC G23 | 11 | 33.0 |
| 40703 | GBX13/UVC GX23 | 13 | 31.0 |
| 40704 | GBX18/UVC/2G11 | 18 | 51.0 |
| 40705 | GBX36/UVC/2G11 | 36 | 110.0 |
| 40706 | GBX55/UVC/2G11 | 55 | 156.0 |

With reference to Table 1, UV lamps with lower required power inputs generally produce less irradiance. As the irradiance decreases, the required time for UV treatment of a particular volume of water increases. Accordingly, for portable water treatment apparatuses 100 powered by a hand crank, the container size may be configured to retain a relatively small amount of water (e.g., 1-5 liters) so that the water may receive the required UV dose for effective disinfection within a relatively reasonable time period. The reasonableness of the time period may depend upon factors such as the form of the electrical power, the frequency of treating water using the apparatus, the educational awareness of the user regarding the importance of disinfecting water, and so on.

For example, a typical user operating a hand crank system may be willing to operate the hand crank to generate electricity for the UV light for periods of five minutes or less. Thus, the reasonable time for disinfection in a hand crank system may be approximately five minutes or less. As another example, a typical user operating a pedal crank system may be willing to operate the pedal crank to generate electricity for the UV light for periods of five to ten or more minutes. Thus, the reasonable time for disinfection in a pedal crank system may be five to ten or more minutes. The foregoing examples are merely illustrative and are not intended to imply a specific amount of time with respect to what constitutes a reasonable time period to operate the user-powered generator 104.

The UV light source 110 may be mounted on an interior surface of the container 102 using one or more generally U-shaped UV light mounting brackets 182. The mounting brackets 182 may be formed from a resilient material (e.g., a flexible metal) and/or shaped into a resilient form that expands from a rest position to receive the lights bulbs of the UV light source 110 and then returns towards its rest position to snugly retain the UV light bulbs within the UV mounting brackets 182. The UV mounting brackets 182 may include one or more holes for receiving UV mounting fasteners 184 to join the UV mounting brackets 182 to the container 102. Although shown and described as joined to the container 102 using brackets 182 and mechanical fasteners 184, the UV light source 110 may be joined to the container using any suitable connection method or system.

The UV light source 110 may be mounted or otherwise joined to the container 102 at a position above the water level within the upper portion 154 of the container 102. Mounting the UV light source 110 above the water level may help to prevent fouling of UV light source 110, which can reduce the effectiveness of the UV treatment. At least a portion of an inner surface of the upper portion 154 may be formed from, or coated with, a reflective material to reflect UV light into the water or other fluid contained within the container 102.

The ballast 106 for converting the electrical power from the user-powered generator 104 for use by the UV light source 110 may be selected based on the selected UV light source 110. For example, a CFL Magnetic Preheat ballast sold by General Electric may be used with the Biox™ Germicidal UV lamps.

The following describes one possible method of operation for using the portable water treatment apparatus 100 to disinfect water. The funnel 118 may be joined to the fluid inlet 116 of the container 102. A batch of water may be placed in the reservoir 158 of the container 102 using the funnel 118. Prior to the fill step, the user may disconnect the fluid conduit 122 from the upper elbow 178 to provide an air vent via the air passage defined in the upper elbow 178 and the air opening 180 defined in the container 102. Alternatively, the upper portion 154 of the container 102 may be rotated relative to the lower portion 156 of the container 102 to provide access to the reservoir 158, the reservoir 158 may be filled with water, and the upper portion 154 may be rotated back to a position that forms the chamber 160 with the lower portion 156. In this alternative filling step, once the upper and lower portions 154, 156 are positioned to reform the chamber 160, the upper portion 154 may be secured to the lower portion 156 using the one or more securing devices 170, such as latches, to prevent inadvertent separation of the upper portion 154 from the lower portion 156.

A user may operate the user-powered generator 104 to activate the UV light source 110. After activation of the UV light source 110 for a sufficient period of time to disinfect the water, the user may disconnect the fluid conduit 122 from the upper elbow 178 if not already disconnected from the upper elbow 178. The user may then move the upper portion 176 of the fluid conduit 122 to a position relative to the lower elbow 172 that allows fluid to flow under the influence of gravity through the fluid conduit 122 via the fluid conduit fluid passage 174, thus removing UV treated water from the container 102 for consumption or other use by the user. The user may use the color wheel to determine the estimated period of time required to disinfect the water. The container 102 may be refilled with another batch of water to disinfect in the container 102 by repeating the above-described steps for filling the reservoir 158 with water.

FIGS. 5-8 depict a second example of a portable water treatment apparatus 200 with like reference numbers used for components of the second example of the portable water treatment apparatus 200 that are the same as or similar to the components of the first example of the portable water treatment apparatus 100. The second example of the portable water treatment apparatus 200 is generally similar to the first example of the portable water treatment apparatus 100 with certain similarities and differences described in more detail below. More particularly, like the first example of the portable water treatment apparatus 100, the second example of the portable water treatment apparatus 200 may include a container 102, a user-powered generator 104, a ballast 106, and a UV light source 110. In some versions of the second example of the portable water treatment apparatus 200, the portable water treatment apparatus 200 may include an energy storage device.

Unlike the first example of the portable water treatment apparatus 100, the ballast 106 for the second example of the portable water treatment apparatus 200 may be positioned within the chamber 160 defined by upper and lower portions 154, 156 of the container 102. Further, the user-powered generator 104 may be joined to the lower portion 156 of the container 102. In the second example of a portable water treatment apparatus 200, a spigot 202 rather than a fluid conduit and a lower elbow may be used to obtain water from the fluid reservoir 158.

The spigot 202 may be selectively opened to deliver fluid from the fluid reservoir 158. The spigot 202 may be removably (e.g., threaded) or fixedly (e.g., heat welded) joined to the container 102 by any suitable connection method. However, like the first example of a portable water treatment apparatus 100, some versions of the second example of the portable water treatment apparatus 200 may use lower and upper elbows with a fluid conduit to supply water from the reservoir 158.

The second example of the portable water treatment apparatus 200 may include an electrical disconnect 204. The electrical disconnect 204 may be positioned between the UV light source 110 and the user-powered generator 104. The electrical disconnect 204 may take the form of plugs that may be joined when the upper and lower portions 154, 156 are joined. When the upper and lower portions 154, 156 are not joined together, the plugs may be disconnected, thus disconnecting the electrical connection between the user-powered generator 104 and the UV light source 110. Such electrical disconnect may enhance the safety of the portable water treatment apparatus 200 by preventing the UV light source 110 from being operational when the upper and lower portions 154, 156 of the container 102 are not joined. Permanently, or relatively permanently, joining the upper and lower portions 154, 156 prior to delivering the apparatus 200 to a user may also enhance the safety of the apparatus 200 by restricting access to the UV light source 110. In such versions of the second example of the portable water treatment apparatus 200, a fluid inlet may be formed in the container 102 to allow the fluid reservoir 158 to be filled with water or other fluid.

The second example of the portable water treatment apparatus 200 may further include a handle 206 or other member for a user to grasp. The handle 206 may be joined to the upper portion 154 and may be used to carry the container 102. The handle 206 may be integrally formed with the upper portion 154 or may be fixedly or removably joined to the upper portion 154 by a suitable connection method. Although the handle 206 is shown as positioned on the top surface of the upper portion 154 of the container 102, one or more handles 206 may be formed on the sides of the upper portion 154 of the container 102, the lower portion 156 of the container 102, or both.

The second example of the portable UV water treatment apparatus 200 may include an overflow outlet 208. The overflow outlet 208 may be formed in the lower portion 156 of the container 102 as shown in FIG. 1, in the upper portion 154, or in both the upper and lower portions 154, 156. The overflow outlet 208 may limit the amount of water stored in the container 102 by discharging water in excess of the intended storage capacity of the reservoir 158. Such discharge may be desirable to minimize the potential for overfilling the reservoir 158, and thus reduce the potential for contact between the UV light source 110 and water in configurations designed for the UV light source 110 to avoid contact with the water contained within the reservoir 158. In versions of the second example of the portable water treatment apparatus 200 with a fluid inlet, the overflow outlet 208 may also provide an air vent for air to exit the chamber 160 when filling the fluid reservoir 158 via the fluid inlet.

The overflow outlet 208 may be an opening defined in the container 102. The opening may be rectangular or any other desired shape. The overflow outlet 208 may include a one-way valve, such as a check valve, to prevent water from flowing into the container through the overflow outlet 208. In some embodiments, a porous screen, a filter or another water permeable, particle restricting device may be positioned within, or may cover, the overflow outlet 208 to limit particulates or other solids from entering into the reservoir 158 through the overflow outlet 208 while allowing water to flow out of the container 102 through the overflow outlet 208. A stop, cover, or other insert may be provided to selectively open and close the overflow outlet 208, if desired. To limit the potential for misplacing or losing the stop, cover or other insert, the stop, cover or other insert may be joined to the container 102 by a strap or other connection element to keep it joined to the container 102 when not received within the overflow outlet 208.

Operation of the second example of the portable water treatment apparatus 200 may be substantially similar to the operation of the first example of a portable water treatment apparatus 100 described in more detail above. However, the electrical disconnect plugs may need to be joined to electrically connect the user-powered generator 104 with the UV light 110 source prior to operating the user-powered generator 104 to power the UV light source 110. Further, the electrical disconnect plugs may be disconnected prior to removing the upper portion 154 of the container 102 from the lower portion 156 of the container 102 to prevent inadvertent operation of the UV light source 110 when the upper and lower portions 154, 156 do not enclose the UV light source 110.

Figure 9:
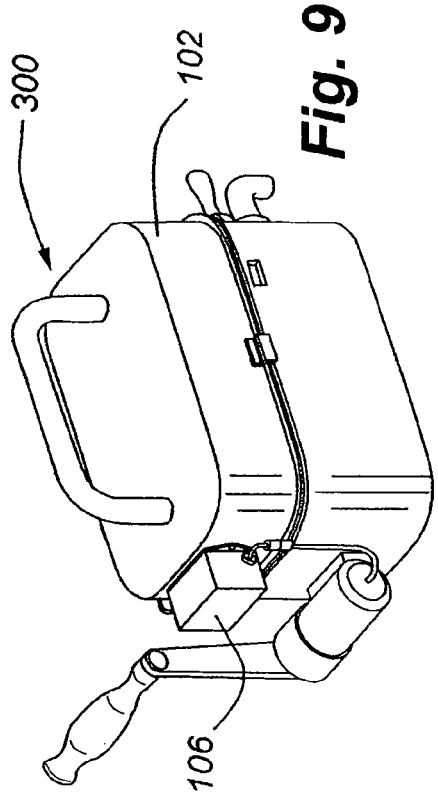
FIG. 9 is a perspective view of a third example of a water treatment apparatus.

FIG. 9 depicts a third example of a portable water treatment apparatus 300 with like reference numbers used for components of the third example of the portable water treatment apparatus 300 that are the same or similar to the components of previously described portable water treatment apparatuses. The third example of the portable water treatment apparatus 300 is similar to the second example of the portable water treatment apparatus 200 except the ballast 106 is mounted on the exterior of the container 102. The third example of the portable water treatment apparatus 300 operates in substantially the same manner as the first and second examples of the portable water treatment apparatuses 100, 200.

Figure 11:
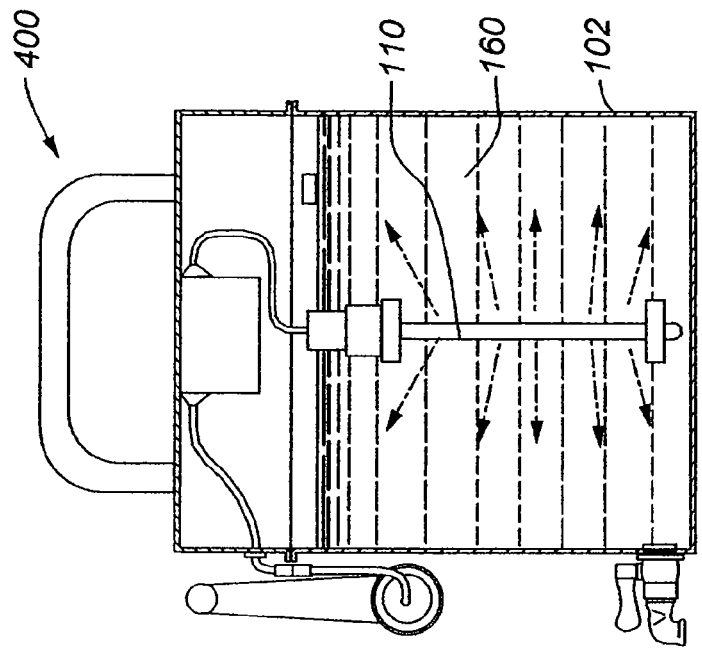
FIG. 11 is a cross-section view of the water treatment apparatus depicted in FIG. 10, viewed along line 11-11 in FIG. 10.
Figure 10:
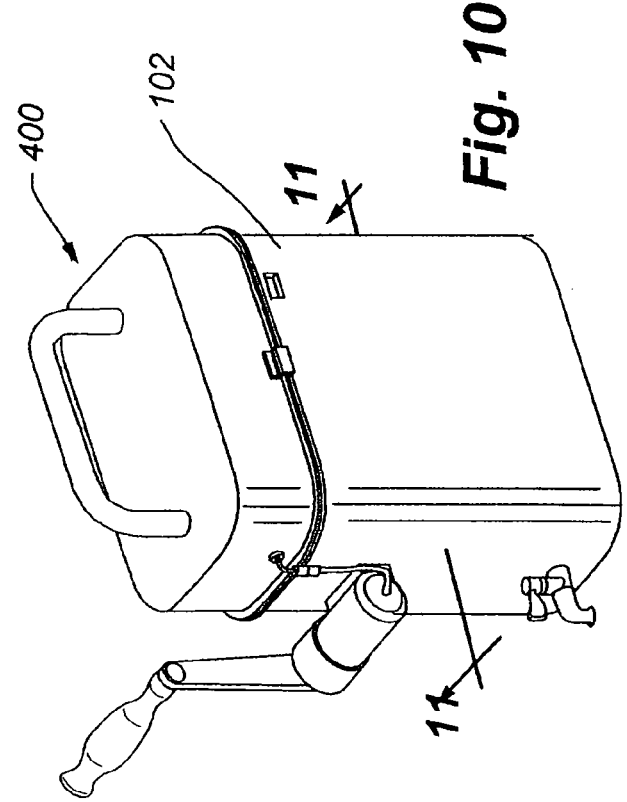
FIG. 10 is a perspective view of a fourth example of a water treatment apparatus.

FIGS. 10 and 11 depict a fourth example of a portable UV water treatment apparatus 400 with like reference numbers used for components of the fourth example of the portable water treatment apparatus 400 that are the same or similar to the components of previously described portable water treatment apparatuses. The fourth example of the portable water treatment apparatus 400 is similar to the second example of the portable water treatment apparatus 200 except the UV light source 110 extends into the lower portion of the chamber 160. By extending the UV light source 110 at least partially into the lower portion of the chamber 160, the UV light source 110 may be at least partially submerged within water received in the container 102. At least partial submergence of the UV light source 110 in the water contained within the container 102 may provide more efficient UV treatment by bringing the UV light source 110 closer to the water compared to mounting the UV light source 110 within the upper portion of the chamber 160. However, the UV light source 110 may require more frequent cleaning or other maintenance compared to the non-submersed UV light source 110 because the UV light source 110 may be more readily fouled.

The fourth example of the portable water treatment apparatus 400 may further include a protective sleeve, which may encompass at least a portion, up to the whole, UV light source 110. The protective sleeve may be a flexible film or a firm plastic sleeve that covers a light bulb of the UV light source 110, or may be integrally formed with the light bulb. The fourth example of the portable water treatment apparatus 400 operates in substantially the same manner as the first, second and third examples of the portable water treatment apparatuses 100, 200, 300.

Figure 12:
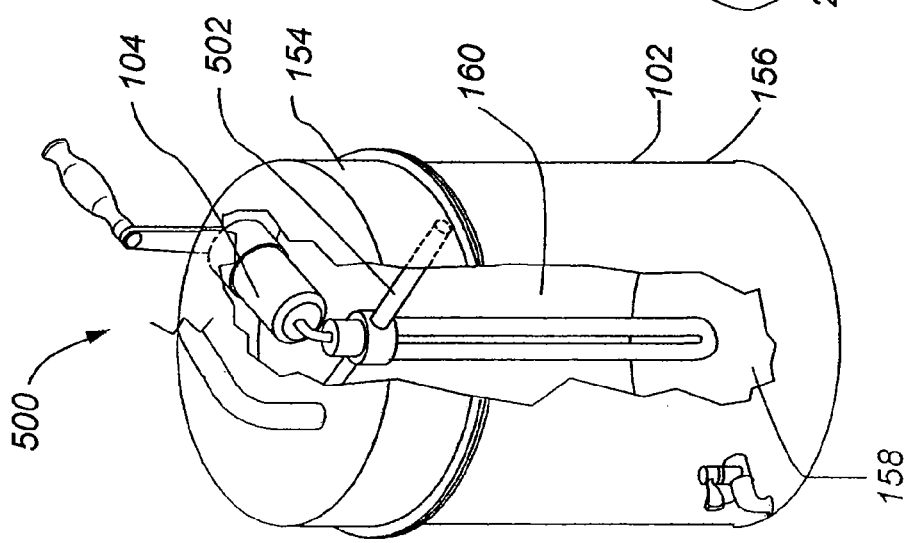
FIG. 12 is a perspective view of a fifth example of a water treatment apparatus.

FIG. 12 depicts a fifth example of a portable water treatment apparatus 500 with like reference numbers used for components of the fifth example of the portable water treatment apparatus 500 that are the same or similar to the components of previously described portable water treatment apparatuses. The fifth example of the portable water treatment apparatus 500 is similar to the fourth example of the portable water treatment apparatus 400 except at least a portion of the user-powered generator 104 may be received within the chamber 160 of the container 102. Also, the upper and lower portions 154, 156 of the container 102 of the fifth example of the portable water treatment apparatus 500 may define a generally cylindrical reservoir 158. The fifth example of the portable water treatment apparatus 500 may further include a UV light support 502 joined to an inner surface of the upper portion 154 of the container 102 to join the UV light source 110 to the upper portion 154. The UV light support 502 may also restrict movement of the UV light source 110 within the chamber 160 when the upper and lower portions 154, 156 of the container 102 are joined. The fifth example of the portable water treatment apparatus 500 operates in substantially the same manner as the first, second, third and fourth examples of the portable water treatment apparatuses 100, 200, 300, 400.

Figure 13:
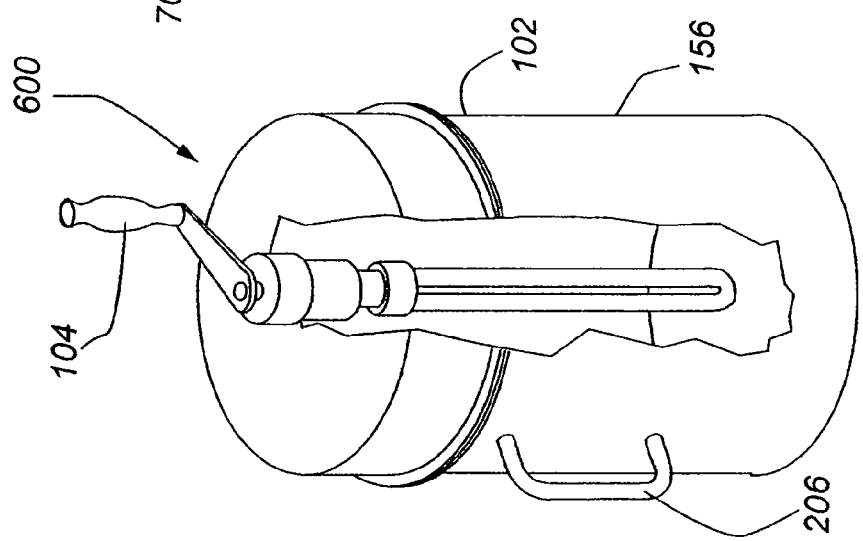
FIG. 13 is a perspective view of a sixth example of a water treatment apparatus.

FIG. 13 depicts a sixth example of a portable water treatment apparatus 600 with like reference numbers used for components of the sixth example of the portable water treatment apparatus 600 that are the same or similar to the components of previously described portable water treatment apparatuses. The sixth example of the portable water treatment apparatus 600 is similar to the fifth example of the portable water treatment apparatus 500 except a portion of the user-powered generator 104 extends from the top surface of the container 102 and a pair of grasping elements 206, such as handles, are positioned on the lower portion 156 of the container 102. The sixth example of the portable water treatment apparatus 600 operates in substantially the same manner as the first, second, third, fourth and fifth examples of the portable water treatment apparatuses 100, 200, 300, 400, 500.

Figure 14:
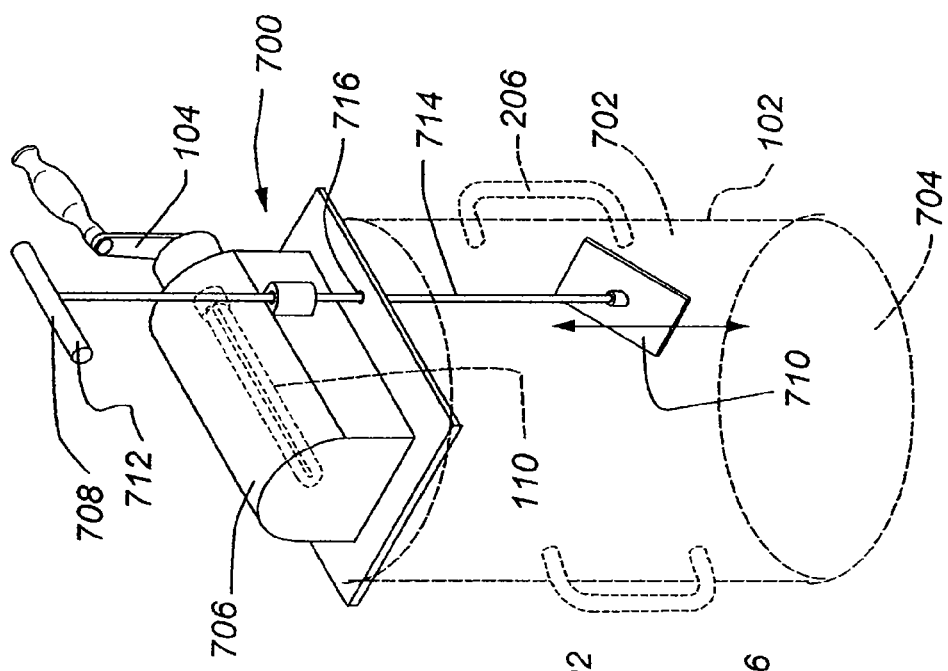
FIG. 14 is a perspective view of a seventh example of a water treatment apparatus with a first example of a housing.

FIG. 14 depicts a seventh example of a portable water treatment apparatus 700 with like reference numbers used for components of the seventh example of the portable water treatment apparatus 700 that are the same or similar to the components of previously described portable water treatment apparatuses. The seventh example of the portable water treatment apparatus 700 may include a container 102 (shown in dashed line), such as a bucket, having a sidewall 702 joined to a base 704. Together, the sidewall 702 and the base 704 may define a space for holding water or other liquid. An upper portion of the sidewall 702 may define an opening for accessing the space. Like the previously described examples of portable water treatment apparatuses, a handle or other grasping element 206 may be joined the container 102 to facilitate carrying of the container 102.

A housing 706 may be fixedly or removably joined to the container 102 proximate the upper opening. The housing 706 may be fixedly joined to the container 102 by welds, adhesives, by integrally forming the housing 706 with the container 102, or by any other suitable means for fixedly joining two objects. The housing 706 may be removably joined to the container 102 by bearing the housing 706 on the container's sidewalls 702, using mechanical fasteners (such as screws, clamps and so on) to join the housing 706 to the container 102, or using any other suitable means for removably joining two objects.

A UV light source 110 and a ballast may be contained within the housing 706. The user-powered generator 104 (e.g., a hand crank) may be mounted or otherwise joined to the housing 706. At least a portion of the user-powered generator 104 may be contained within the housing 706. Like the previous examples of portable water treatment apparatuses, the user-powered generator 104 may be operated to generate electricity for the UV light source 110. The housing 706 may encompass the upper and side portions of the UV light source 110 to shield a user from the UV light emitted by the UV light source 110.

The seventh example of the portable water treatment apparatus 700 may further include a mixing device 708. The mixing device 708 may include a paddle portion 710 and a handle portion 712 joined by a shaft 714. The shaft 714 may extend through a hole 716 formed in the housing 706. A user may operate the mixing device 708 during UV treatment by pushing and pulling on the handle portion 712 to move the paddle portion 710 in the water. Using the mixing device 708 to move the water in the container 102 helps to move the water in the bottom of the container 102 towards the top, thus enhancing the UV treatment of the water in the container 102 by moving the water in the bottom of the container 102 closer to the UV light source 110. The seventh example of the portable water treatment apparatus 700 operates in substantially the same manner as the previously described examples of the portable water treatment apparatuses.

Figure 15:
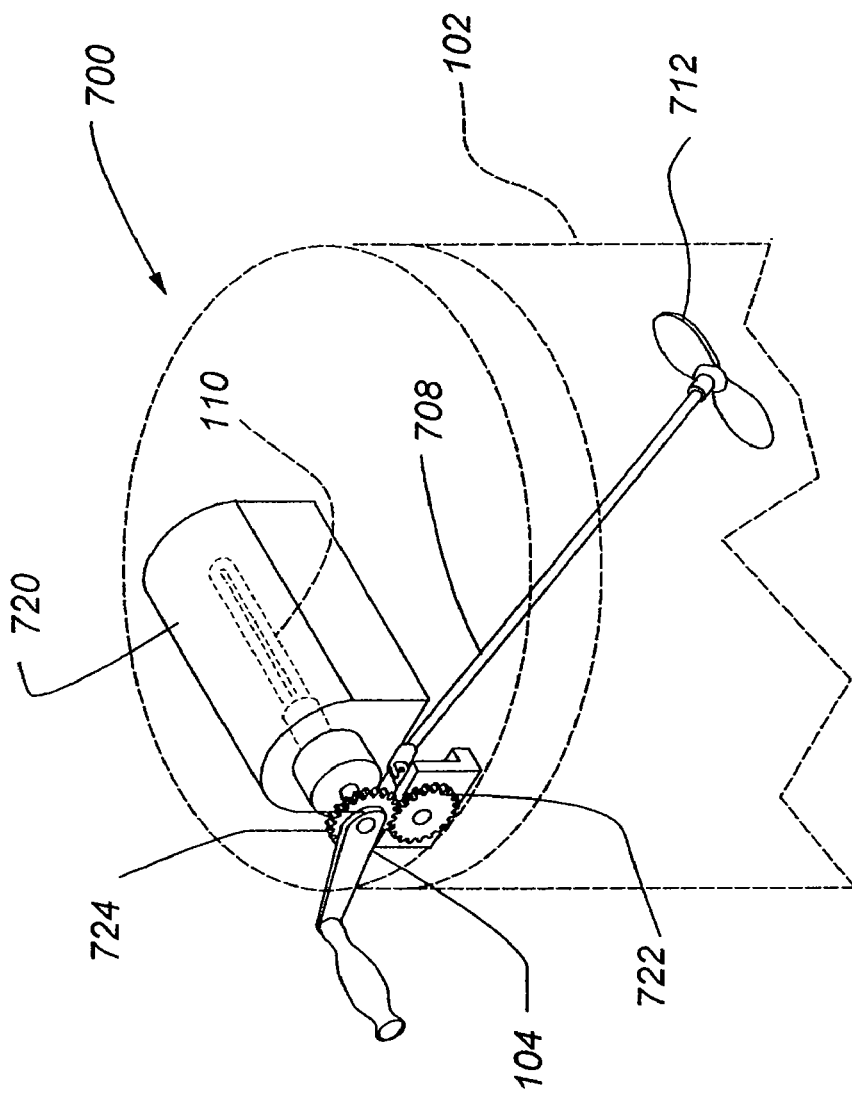
FIG. 15 is a perspective view of the seventh example of water treatment apparatus with a second example of a housing.

FIG. 15 depicts a second example of a housing 720 for the seventh example of the portable treatment apparatus 700. The second example of the housing 720 is similar to the first example of the housing 706 for the seventh example of the portable treatment apparatus 700 except for the mixing device 708. In this second example of the housing 720, the handle portion of the mixing device 708 may be replaced with a mixing device gear 722 that engages a generator gear 724 formed on the user-powered generator 104. Rotating the crank of the user-powered generator 104 causes rotation of the paddle portion 712 of the mixing device 708 through the engagement of the mixing device gear 722 with the generator gear 724. Thus, operation of the user-powered generator 104 to supply electricity to the UV light source 110 also operates the mixing device 708 to move water in the container 102. Any of the housing 706, 720 and mixing devices 708 shown for use with the seventh example of the portable water treatment apparatus 700 may be incorporated, with appropriate modifications, into any of the previous described examples, or any other versions, of the portable water treatment apparatuses.

Figures 16, 17:
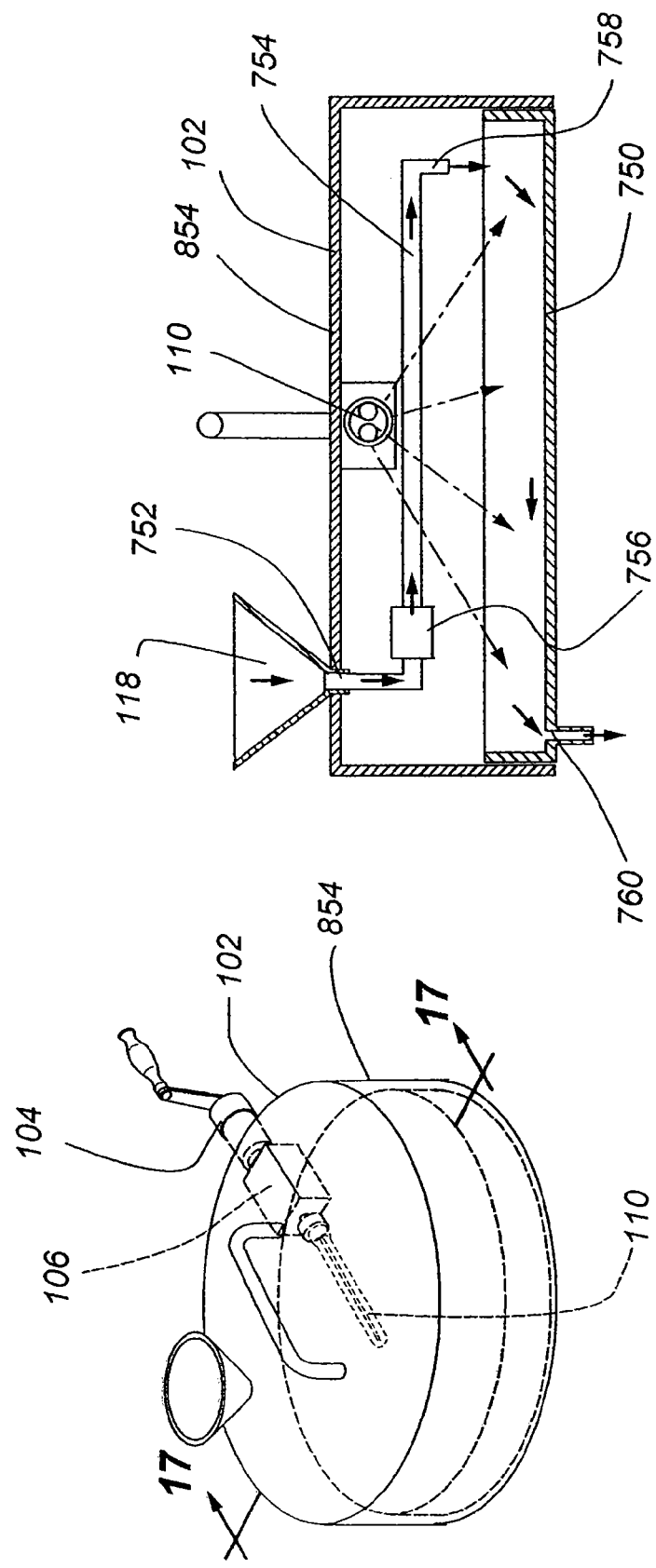
FIG. 16 is a perspective view of a first example of an upper portion of a container for use with a water treatment apparatus.
FIG. 17 is a cross-section view of the upper portion shown in FIG. 16, viewed along line 17-17 in FIG. 16.

FIGS. 16 and 17 depict an example of an upper portion 854 of a container 102 of a portable water treatment apparatus configured for water to flow underneath the UV light source 110 for treatment. A user-powered generator 104 (e.g., a hand crank generator) may be mounted to the upper portion 854 of the container 102 and electrically connected to the UV light source 110 via a ballast 106. The UV light source 110 and the ballast 106 may be mounted within the upper portion 854 of the container 102.

The upper portion 854 of the container 102 may include a base 750 formed at a lower end of the upper portion 854 and fluid inlet 752 defined in an upper side of the upper portion. A funnel 118 or other water collection device may be removably or fixedly joined to the upper portion 854 proximate the fluid inlet 752. The funnel 118 may further include a funnel fluid outlet in fluid communication with the upper portion fluid inlet 752. When the funnel 118 is removable, the upper portion fluid inlet 752 may be closed with a cap or other closure member. When the funnel 118 is fixedly joined to the upper portion 854, a cap or other closure member may be used to close the funnel fluid opening.

Water may be received in the upper portion 854 of the container 102 from the funnel 118 through the upper portion fluid inlet 752 fluidly connected with the funnel fluid outlet. A tube or other fluid conduit 754 may be mounted in the upper portion 854 of the container 102 and may be fluidly connected to the upper portion fluid inlet 752. The fluid conduit 754 may include a flow limiter 756, such as a flow control orifice, for controlling the flow rate of water (or other fluid) through the fluid conduit 754. The fluid conduit 754 may further include a fluid conduit outlet 758 for delivering water to the base 750.

A base outlet 760 in fluid communication with the lower portion of the container 102 may formed at an end distal the end of the base 750 where fluid is received from the fluid conduit 754. By positioning the base outlet 760 distal the fluid receiving end of the base 750, water flows underneath the UV light source 110 prior to entering the lower portion of the container 102 through the base outlet 760. As water flows underneath the UV light source 110, the water may be UV treated using the UV light source 110. The flow limiter 756 may be used to control the flow rate of water passing under the UV light source 110 to control the amount of time the water is exposed the UV light. To facilitate water flowing from the fluid receiving end to the base outlet 760, the base 750 may slope downward from the fluid receiving end to the base outlet 760. Although water is shown as passing once underneath the UV light source 110, the upper portion 854 may be divided in multiple fluid passages to cause the water to flow back and forth from end to end underneath the UV light source 110 prior to entering the lower portion through the base outlet 760.

FIGS. 18 and 19 depict a second example of an upper portion 954 of a container 102 of a portable water treatment apparatus configured for water to flow underneath the UV light source 110 for treatment. The second example of the upper portion 954 is similar to the first example of the upper portion 854 except the upper portion 154 may be divided into top and bottom sections 762, 764 joined by a fluid conduit 766. Fluid may be received in the top section 762 from a fluid opening 768 defined in an upper end of the upper portion 954. The fluid opening 768 may be selectively closed using a lid, cap or other closure member 770. A fluid opening sidewall may extend upwardly from the upper portion around the fluid opening 768 for pressing fitting, threading, or otherwise joining the lid 770 to the upper portion 154 for closing the fluid opening 768. The lid 770 may be fixedly joined to the upper portion using a strap or other connecting element to prevent the lid 770 from being misplaced when not covering the fluid opening 768.

Like the first example of an upper portion 854 of the container 102 with water flow through the upper portion, the fluid conduit 766 may include a flow limiter 772 to control the rate of water flow from the top section 762 to the bottom section 764. Water received in the bottom section 764 may flow along a base 774 to a base outlet 776 positioned at an end distal the fluid conduit 766. The fluid conduit 766 and the base outlet 776 may be positioned relative to the UV light source 110 to cause water to flow parallel to a length of the UV light source 110, thus increasing the relative exposure time to UV light from the UV light source 110 as water flows to the base outlet 776 and into the lower portion of the container 102.

Figure 20:
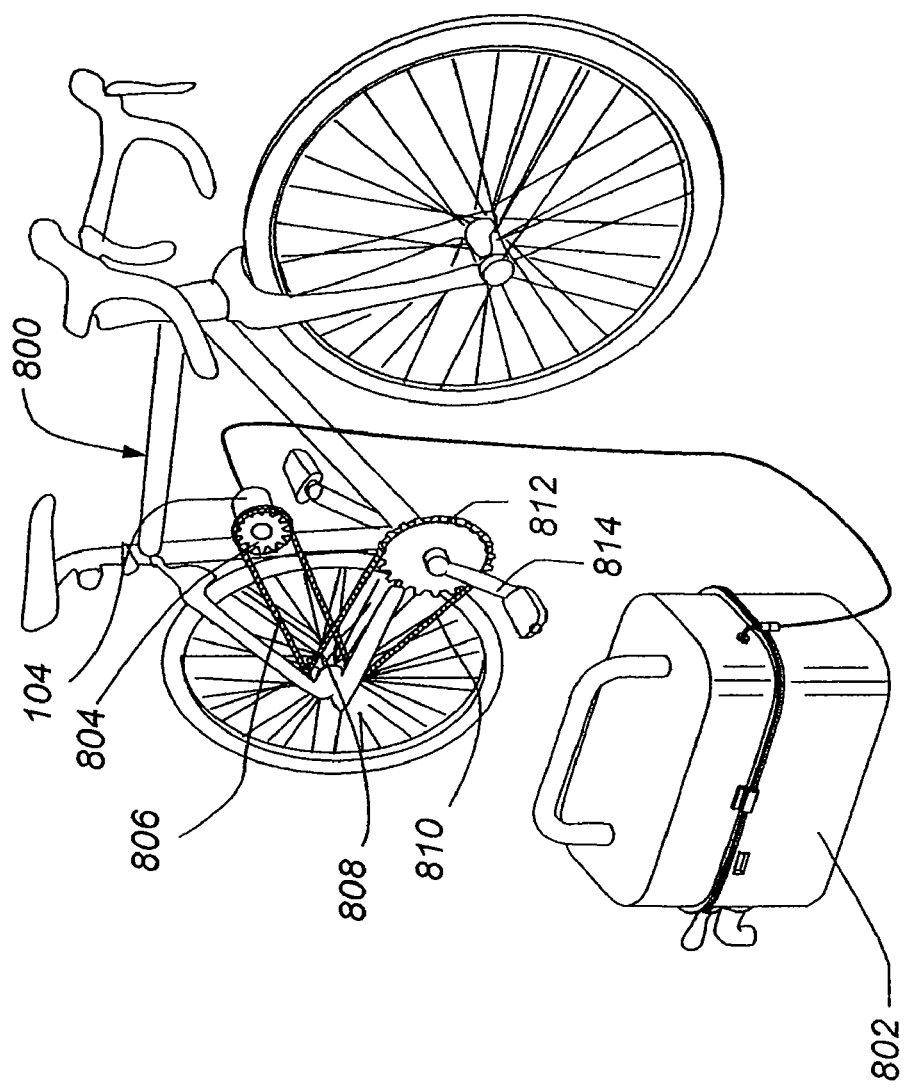
FIG. 20 depicts a perspective view of a bicycle operatively associated with a water treatment apparatus.

FIG. 20 depicts a bicycle 800 joined to a portable water treatment apparatus 802 for providing power to the UV light source. The portable water treatment apparatus 802 shown in FIG. 20 is similar to the second example of the portable water treatment apparatus 200 except the user-powered generator 104 is joined to the bicycle 800. Although shown as joined to the bicycle 800, the user-powered generator 104 could be joined to the portable water treatment apparatus 802. Further, although shown as a bicycle 800, another other pedal powered device, including, but not limited to, a tricycle, unicycle, or pedal generator may be used to generater power for the UV light source. Yet further, although the portable water treatment apparatus 802 is shown as similar to the second example of the portable water treatment apparatus 200, any of the previously described portable water treatment apparatuses may be used with the bicycle 800.

The user-powered generator 104 may include a gear or cog 804 for engaging a first chain or other linkage 806. The first chain 806 may be joined to a rear cog 808 of the bicycle 800. A second chain or linkage 810 may be engaged with another rear cog of the bicycle 800 and to a front chain ring 812 of the bicycle 800. The front chain ring 812 may be joined to a crank 814 with pedals that may be engaged by a user to rotate the front chain ring 812 around a pivot axis. Rotation of the front chain ring 812 rotates the rear cogs 808, which rotates the first chain 806. Rotation of the first chain 806 rotates the gear 804 on the user-powered generator 104 to generate electricity to power the UV light source.

The hand crank generators of any of the previously described portable UV water treatment apparatuses may be replaced with another power source, such as a pedal crank generator (which is another type of user-powered generator), a plug for connection to an electrical outlet, a solar collector (which may be connected to a battery for storing energy), a battery, or any combination of power sources. Each of these power sources may provide more power to the UV light source than the hand crank generator, thus allowing more water to be treated within a reasonable time period. For example, the pedal crank generator may deliver up to 125 Watts or more of power, while up to 50 Watts may be generated by a hand crank generator. One possible pedal crank generator is the Human Power Generator pedal crank generator sold by Windstream Power, LLC. The increased wattage provided by these other sources of electricity may allow containers to contain up to 10 liters or more water for UV treatment within a relatively reasonable time period.

Any of the previously described examples of portable UV water treatment apparatuses may further include a timing device for measuring the time the UV light source treats the water. The timing device may be connected to an output device for displaying the time or for indicating when the water has been treated for a sufficient time by the UV light. The output device may be a digital display, one or more LED or other lights, or any other output device that can provide a numerical or other symbolic indication of when the water has been sufficiently treated.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the example of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A water treatment apparatus comprising:
 a container comprising:
  a first portion and a second portion removably joined together and defining a chamber to receive a batch of water when joined;
  a fluid outlet in fluid communication with the chamber; and
  an overflow outlet providing fluid communication between the chamber and an area external the container when the first portion and the second portion are joined to define the chamber;
 a UV light source contained within the chamber; and
 an electrical supply operatively associated with the UV light source, wherein the electrical supply provides electrical power to the UV light source for treating the batch of water received within the chamber using the UV light source.

2. The water treatment apparatus of claim 1, wherein the electrical supply comprises a user-powered generator.

3. The water treatment apparatus of claim 2, wherein the user-powered generator comprises a hand crank generator.

4. The water treatment apparatus of claim 2, wherein the user-powered generator comprises a pedal crank generator.

5. The water treatment apparatus of claim 2, wherein the user-powered generator is mounted on the container.

6. The water treatment apparatus of claim 1, further comprising a mixer at least partially received in the container.

7. The water treatment apparatus of claim 1, wherein the UV light source at least partially extends into the batch of water received within the chamber.

8. The water treatment apparatus of claim 1, wherein the UV light source comprises a UV lamp.

9. The water treatment apparatus of claim 1, further comprising an electrical disconnect to selectively connect and disconnect the electrical power between the electrical supply and the UV light source.

10. The water treatment apparatus of claim 1, wherein the fluid outlet comprises a spigot.

11. The water treatment apparatus of claim 1, wherein the chamber defines a volume and the overflow outlet limits an amount of water by volume contained within the chamber to an amount less than the volume defined by the chamber.

* * * * *